(12) United States Patent
Endo et al.

(10) Patent No.: US 6,691,818 B2
(45) Date of Patent: Feb. 17, 2004

(54) CONTROL UNIT FOR ELECTRIC POWER STEERING APPARATUS

(75) Inventors: Shuji Endo, Gunma (JP); Hui Chen, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/949,679

(22) Filed: Sep. 12, 2001

(65) Prior Publication Data

US 2002/0043423 A1 Apr. 18, 2002

(30) Foreign Application Priority Data

Sep. 11, 2000 (JP) ........................................ 2000-274525

(51) Int. Cl.[7] ............................................... B62D 5/04
(52) U.S. Cl. .......................... 180/446; 180/443; 701/41
(58) Field of Search ................................ 180/446, 443; 701/41, 42; 318/432, 433, 434, 437

(56) References Cited

U.S. PATENT DOCUMENTS

| 4,834,203 A | * | 5/1989 | Takahashi et al. ........... 180/446 |
| 5,040,629 A | * | 8/1991 | Matsuoka et al. ........... 180/446 |
| 5,201,818 A | * | 4/1993 | Nishimoto .................. 180/446 |
| 5,467,279 A | * | 11/1995 | Wada et al. ................... 701/42 |
| 5,469,357 A | * | 11/1995 | Nishimoto .................... 701/41 |
| 5,507,359 A | * | 4/1996 | Wada .......................... 180/446 |
| 5,698,956 A | * | 12/1997 | Nishino et al. .............. 318/432 |
| 5,699,249 A | * | 12/1997 | Noro et al. .................... 701/42 |
| 5,881,836 A | * | 3/1999 | Nishimoto et al. .......... 180/446 |
| 6,039,144 A | * | 3/2000 | Chandy et al. .............. 180/446 |
| 6,131,693 A | * | 10/2000 | Mukai et al. ................ 180/446 |
| 6,360,151 B1 | * | 3/2002 | Suzuki et al. .................. 701/41 |
| 2002/0017885 A1 | * | 2/2002 | Endo ........................... 318/432 |
| 2002/0060538 A1 | * | 5/2002 | Hara et al. .................. 318/432 |
| 2002/0116105 A1 | * | 8/2002 | Chen et al. .................... 701/41 |

FOREIGN PATENT DOCUMENTS

| JP | 9-156256 A | 6/1997 |
| JP | 10-291481 A | 11/1998 |
| JP | 2000-95131 A | 4/2000 |

* cited by examiner

Primary Examiner—Lesley D. Morris
Assistant Examiner—Daniel Yeagley
(74) Attorney, Agent, or Firm—Sughrue Mion, PLLC

(57) ABSTRACT

There is provided a control unit for an electric power steering apparatus that controls a motor for giving a steering assist force to a steering mechanism based on a current control value calculated from a steering assist command value calculated based on a steering torque generated in a steering shaft, and a current value of the motor. The control unit has a center responsiveness improving section that differentiates a signal of the steering torque, adds the differentiated value to the steering assist command value, and carries out a phase advancement compensation to the differentiation.

7 Claims, 18 Drawing Sheets

CONTROL UNIT FOR ELECTRIC POWER STEERING APPARATUS

BACKGROUND OF THE INVENTION

1. Field of the Invention

The present invention relates to a control unit for an electric power steering apparatus that provides steering assist force by a motor to the steering system of an automobile or a vehicle. The present invention particularly relates to a control unit for an electric power steering apparatus that gives safe and comfortable steering performance by removing the influence of motor inertia and through the provision of continuous steering feeling in a low-cost structure.

2. Description of the Related Art

An electric power steering apparatus that applies auxiliary load to the steering apparatus of an automobile or a vehicle with turning effort of a motor applies the driving force of the motor to a steering shaft or a rack axis based on a transmission mechanism like gears or belts via a reduction gear. Such a conventional electric power steering apparatus carries out a feedback control of a motor current for accurately generating an assist torque (a steering assist torque). The feedback control is for adjusting a motor application voltage so as to minimize a difference between a current control value and a motor current detection value. The motor application voltage is generally adjusted based on a duty ratio of a PWM (Pulse Width Modulation) control.

A general structure of an electric power steering apparatus will be explained with reference to FIG. 1. A shaft 2 of a steering wheel 1 is connected to a tie rod 6 of running wheels through reduction gears 3, universal joints 4a and 4b and a pinion rack mechanism 5. The shaft 2 is provided with a torque sensor 10 for detecting a steering torque of the steering wheel 1. A motor 20 for assisting the steering force of the steering wheel 1 is connected to the shaft 2 through a clutch 21 and the reduction gears 3. A control unit 30 for controlling the power steering apparatus is supplied with power from a battery 14 through an ignition key 11. The control unit 30 calculates a steering assist command value I of an assist command based on a steering torque T detected by the torque sensor 10 and a vehicle speed V detected by a vehicle speed sensor 12. The control unit 30 then controls a current to be supplied to the motor 20 based on the calculated steering assist command value I. The clutch 21 is ON/OFF controlled by the control unit 30, and is kept ON (connected) in an ordinary operation status. When the control unit 30 has decided that the power steering apparatus is in failure, and also when the power source (voltage Vb) of the battery 14 has been turned OFF with the ignition key 11, the clutch 21 is turned OFF (disconnected).

The control unit 30 mainly comprises a CPU. FIG. 2 shows general functions to be executed based on a program inside the CPU. For example, a phase compensator 31 does not show a phase compensator as independent hardware, but shows a phase compensation function to be executed by the CPU.

Functions and operation of the control unit 30 will be explained below. A steering torque T detected by the torque sensor 10 and then input is phase-compensated by the phase compensator 31 for increasing the stability of the steering system. The phase-compensated steering torque TA is inputted to a steering assist command value calculator 32. A vehicle speed V detected by the vehicle speed sensor 12 is also inputted to the steering assist command value calculator 32. The steering assist command value calculator 32 determines a steering assist command value I as a control target value of a current to be supplied to the motor 20, based on the inputted steering torque TA and the inputted vehicle speed V. The steering assist command value I is inputted to a subtractor 30A, and is also inputted to a differential compensator 34 of a feedforward system for increasing a response speed. A difference (I−i) calculated by the subtractor 30A is inputted to a proportional calculator 35, and is also inputted to an integration calculator 36 for improving the characteristic of a feedback system. Outputs from the differential compensator 34 and the integration calculator 36 are inputted to an adder 30B and added together there. A result of the addition by the adder 30B is obtained as a current control value E, and this is inputted to a motor driving circuit 37 as a motor driving signal. A motor current value i of the motor 20 is detected by a motor current detecting circuit 38, and this motor current value i is inputted to the subtractor 30A and is fed back.

An example of a structure of the motor driving circuit 37 will be explained with reference to FIG. 3. The motor driving circuit 37 comprises an FET (field-effect transistor) gate driving circuit 371 for driving each gate of field-effect transistors FET1 to FET4 based on the current control value E from the adder 30B, an H-bridge circuit composed of the FET1 to the FET4, and a step-up power source 372 for driving a high side of the FET1 and the FET2, respectively. The FET1 and the FET2 are ON/OFF controlled by a PWM (Pulse Width Modulation) signal of a duty ratio D1 determined based on the current control value E, thereby to control the size of a current Ir that actually flows to the motor 20. The FET3 and the FET4 are driven by a PWM signal of a duty ratio D2 defined by a predetermined linear functional expression (D2=a·D1+b, where "a" and "b" are constants) in an area where the duty ratio D1 is small. When and after the duty ratio D2 has also reached 100%, the FET3 and the FET4 are ON/OFF controlled according to a rotation direction of the motor 20 determined by a sign of the PWM signal.

According to a widely-distributed hydraulic power steering apparatus, the apparatus has a characteristic that the friction of a cylinder section increases in proportion to a cylinder pressure P (a horizontal axis T represents a steering torque), as shown in FIG. 4. The apparatus has hysteresis because of the frictional characteristic. When a vehicle is cornering, for example, the hysteresis prevents the steering wheel from being suddenly returned by a self-aligning torque (SAT). This improves the steering of the driver. FIG. 5 shows this status. When the steering torque T has suddenly changed by ΔT, the cylinder pressure changes by P1 in the absence of the hysteresis. However, in the presence of the hysteresis, the cylinder pressure changes by P2(<P1). Therefore, in the presence of the hysteresis, it is possible to make smooth the change in the cylinder pressure P in relation to a change in the steering torque T. It has been known that the hysteresis width changes according to a size of friction. In the case of a rubber packing of a hydraulic cylinder, the rubber is compressed along an increase in the cylinder pressure. The hysteresis width increases based on an increase in Coulomb friction. It is important for the steering that the driver feels strong self-aligning torque at a neutral point, and does not feel so strong self-aligning torque when the vehicle is cornering. In this sense, it is ideal that, like in the hydraulic power steering apparatus, the friction (hysteresis) becomes small in an area of a small steering angle θ, and the friction (hysteresis) becomes large in an area of a large steering angle θ.

On the other hand, according to an electric power steering apparatus, the apparatus has constant friction independent of the assist torque T, as shown in FIG. 6. The electric power steering apparatus is characterized in that it has a constant friction characteristic independent of steering force, as the Coulomb friction of the motor mainly rules out. Thus, the hysteresis has a constant width as shown in FIG. 7. However, the hysteresis width is narrower than the hysteresis width of the hydraulic power steering apparatus during its high-torque time. Therefore, in the electric power steering apparatus, the friction is compensated for in the area of a small steering torque T by attaching importance to the friction characteristic in this area. According to this compensation, however, the friction becomes smaller in an area where the steering torque T is large, as shown in FIG. 5. As a result, the stable feeling of steering is lost when the steering torque T is large like when the vehicle is cornering.

As a control unit that solves the above problems, there is one example disclosed in Japanese Patent Application Laid-open No. 9-156526 A. According to this, a vehicle steering control unit has a steering torque detector for detecting a steering torque, and this control unit controls the assist volume of an electric power assisting unit, based on a detection signal outputted from the steering torque detector. In this vehicle steering control unit, there is provided an adjuster for giving the hysteresis to the detection signal of the steering torque detector.

With the provision of the adjuster, it is possible to give the hysteresis to the detection signal of the steering torque detector. Therefore, it is possible to change the hysteresis characteristic of the operating power assisting unit according to the steering status, based on the detection signal of the steering torque. As a result, it is possible to optimize the torque assist volume. However, according to the above conventional unit, there remains a feeling of intermittence in the steering operation, and the torque control system is unstable. Thus, there has been a problem in that the conventional unit leads to a cost increase because of the need for a provision of new hardware structure.

Further, the present applicant has disclosed a device in Japanese Patent Application Laid-open No. 2000-95131 A. This device applies a negative differential gain when the steering wheel returns, thereby to prevent a sudden reduction in the assist volume. The device applies a positive differential gain when the steering wheel is turned. With this arrangement, a large hysteresis characteristic is given in a high-torque area, and a small hysteresis characteristic is given in a low-torque area near the neutral point. However, according to the above device, there is a risk of generating an unnatural steering feeling, when the negative and positive differential gains are too different in the changeover between the negative and positive differential gains based on the steering wheel return and turn patterns.

Further, Japanese Patent Application Laid-open No.10-291481 A disclosed a device for obtaining a comfortable steering feeling regardless of a running speed and a steering angle of the steering wheel. However, the importance is placed on only the stability of the control system, and therefore, this device has a problem in the responsiveness of the assist torque. Further, it is also important to devise the elimination or minimization of the influence of the motor inertia.

SUMMARY OF THE INVENTION

The present invention has been made to solve the above problems. It is an object of the present invention to provide a control unit for an electric power steering apparatus capable of obtaining continuous, stable and comfortable steering feeling to realize improved steering performance of the steering wheel without the influence of the motor inertia, based on a provision of a continuous hysteresis characteristic in an adjustable width to the electric power steering apparatus using a low-cost structure on software.

The present invention provides a control unit for an electric power steering apparatus that controls a motor for giving a steering assist force to a steering mechanism based on a current control value calculated from a steering assist command value calculated based on the steering torque generated in the steering shaft, and a current value of the motor. The object of the present invention can be achieved based on the provision of a center responsiveness improving section that differentiates the steering torque signal, adds the differentiated value to the steering assist command value, and carries out phase advancement compensation to the differentiation.

Further, the object of the present invention can be achieved more effectively when the phase advancement compensation is carried out before the differentiation, or when the center responsiveness improving section continuously changes the differential gains according to the steering torque and the size of the vehicle speed.

DETAILED DESCRIPTION OF THE PREFERRED EMBODIMENTS

According to the present invention, with an object of improving the responsiveness of assist torque and improving the stability of a torque control system, a value proportional to a differential of a steering torque signal is added to an assist volume (a steering assist command value), by changing a differential gain according to the steering torque and the size of a vehicle speed, in order to increase the responsiveness of the control system. Further, a phase advancement compensation is inserted into the assist volume (the steering assist command value), thereby to remove or reduce the influence of the motor inertia. As the motor inertia appears in the form of a phase delay as the transmission characteristic, it is possible to remove the influence of the motor inertia by inserting the phase advancement compensation.

Based on the continuous changing of the differential gain, there occurs no large variation in the differential gain when the steering torque, the vehicle speed and the steering pattern are changed. Therefore, it is possible to prevent an unnatural steering feeling and to obtain comfortable steering performance. Further, based on the increasing of a differential gain in an area of a small steering torque, it is possible to obtain a characteristic of a small hysteresis by increasing the responsiveness in an area near the neutral point. As a result, it is possible to obtain comfortable steering performance, and to maintain responsiveness and stability in an area of a large steering torque.

Further, in an area of a predetermined steering torque, a differential gain is set smaller as the vehicle speed increases, and a negative differential gain is included. With this arrangement, it is possible to prevent a sudden reduction in the assist volume when the steering wheel returns. As a result, it is possible to obtain an equivalent large hysteresis characteristic, thereby achieving the stability in the steering when the vehicle is cornering.

Embodiments of the present invention will be explained below with reference to the drawings.

Figure 1:
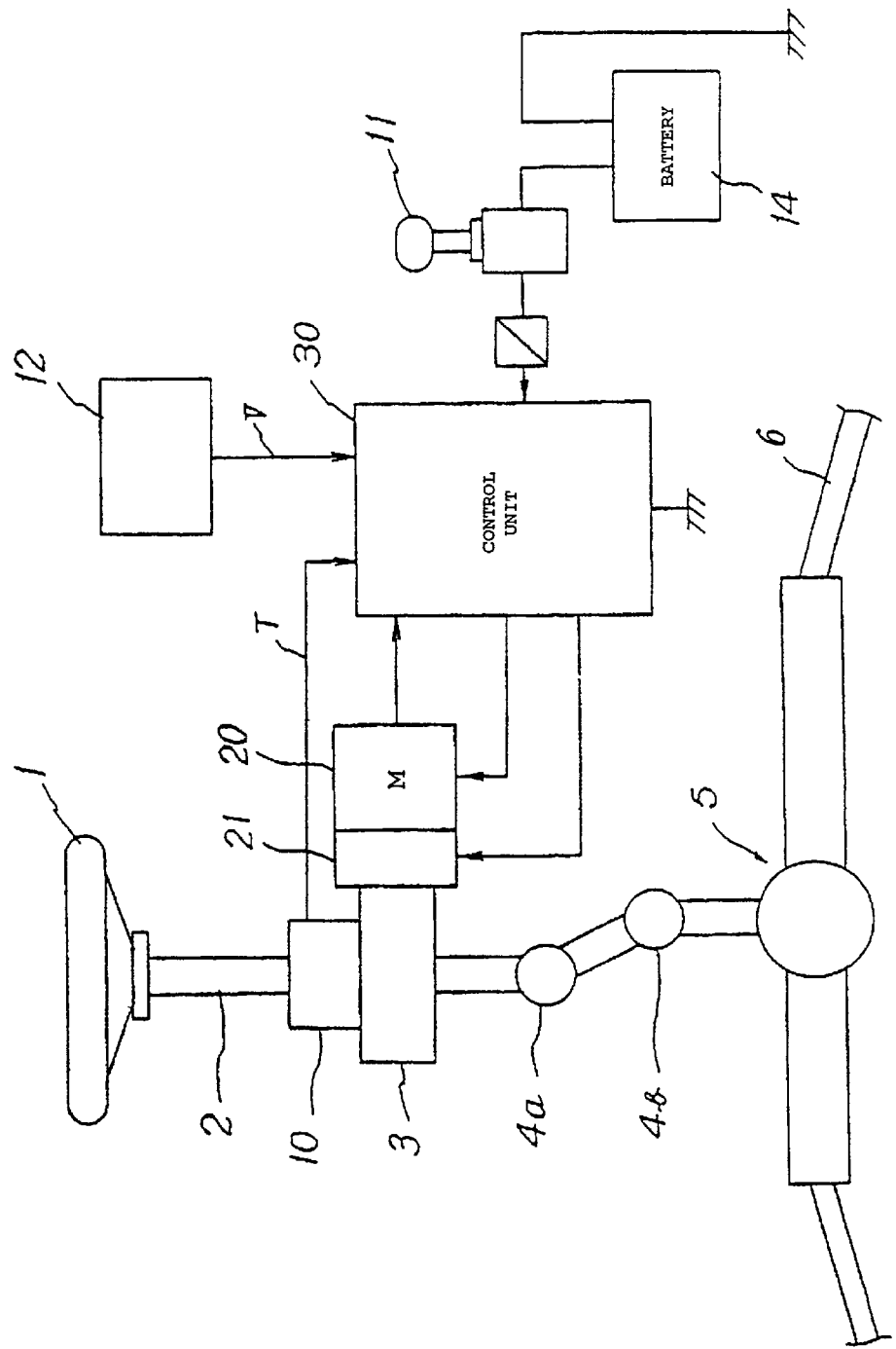
FIG. 1 is a block structure diagram showing an example of a conventional electric power steering apparatus.
Figure 2:
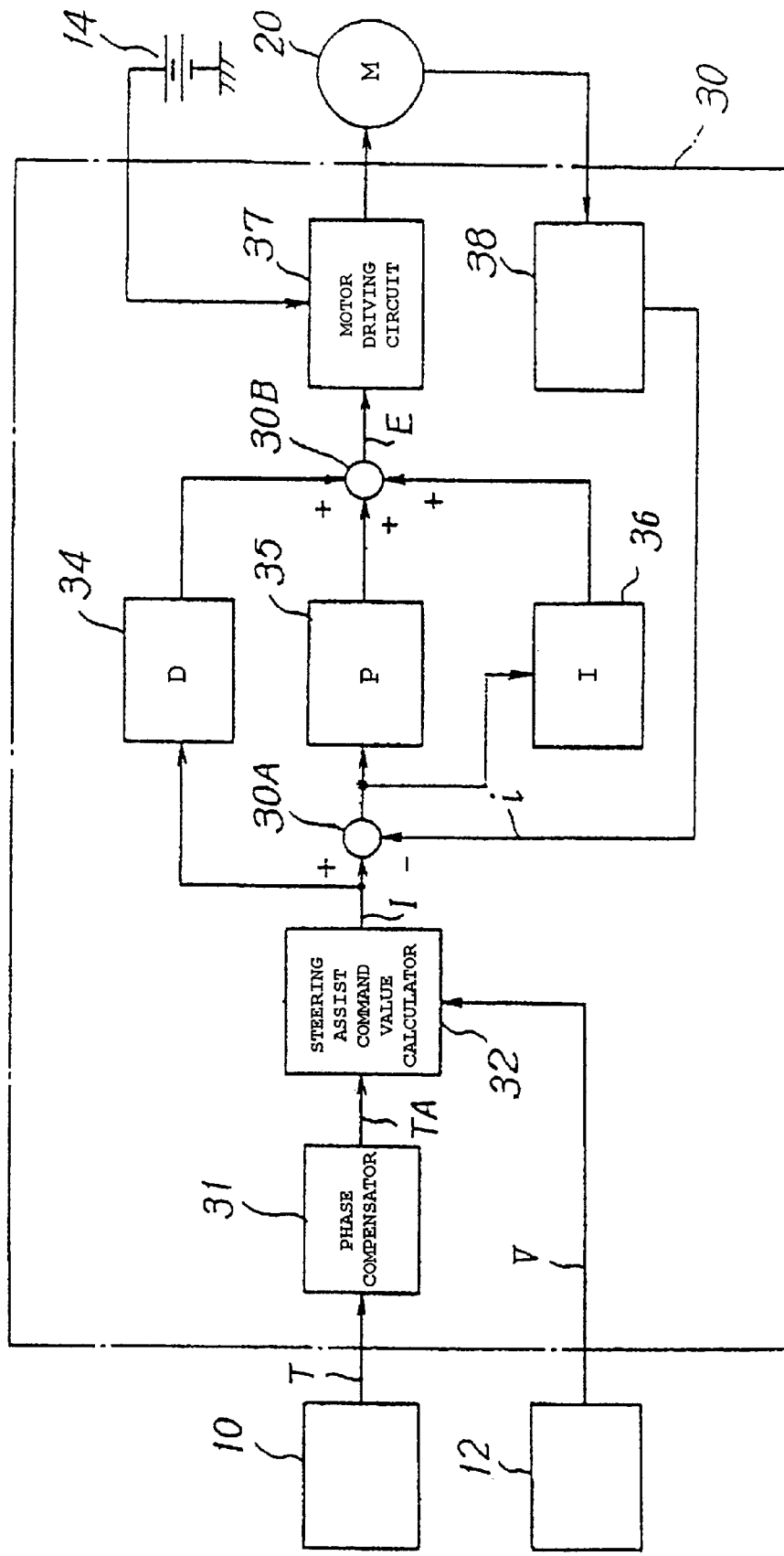
FIG. 2 is a block diagram showing a general internal structure of a control unit.
Figure 3:
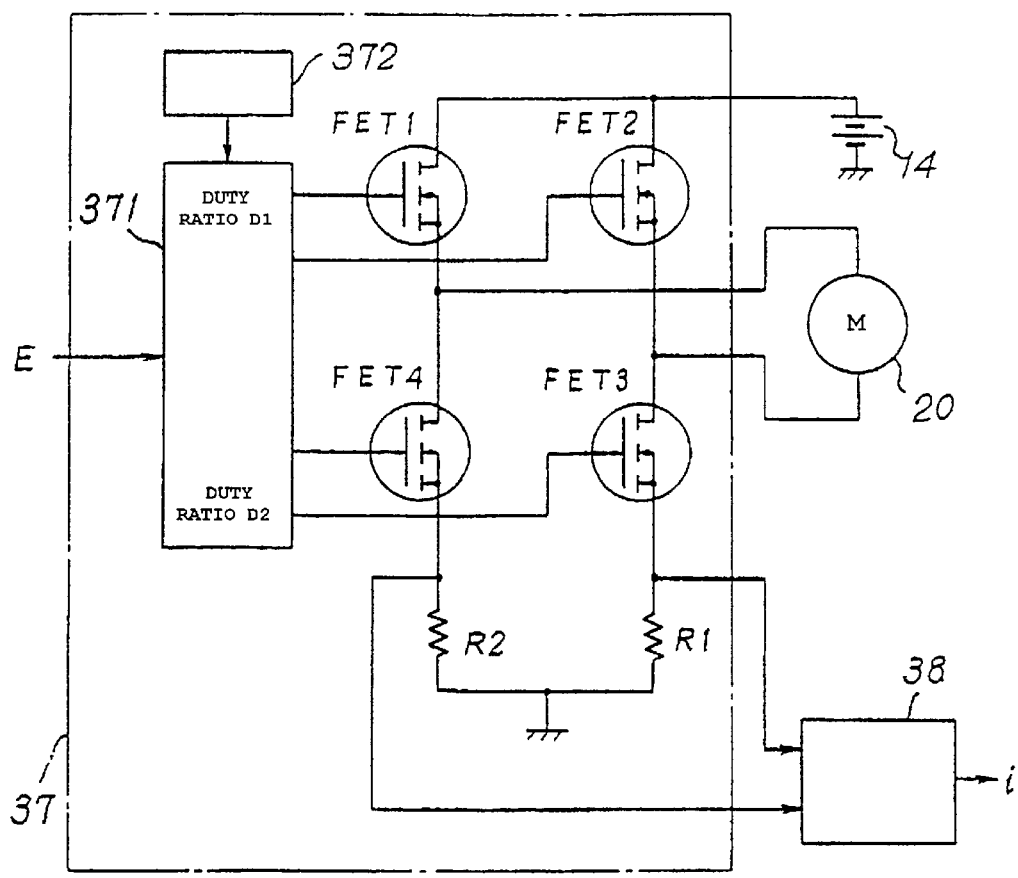
FIG. 3 is a line-connection diagram showing an example of a motor driving circuit.
Figure 4:
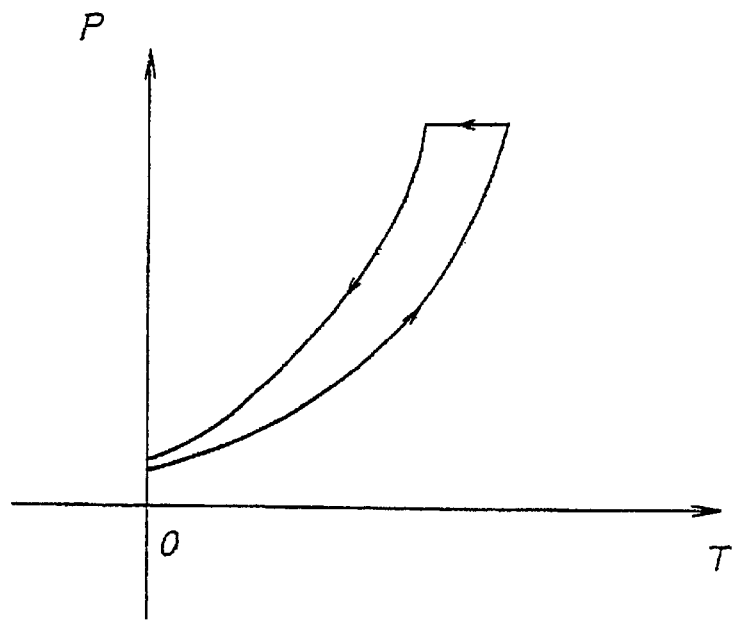
FIG. 4 is a diagram showing an example of the operation of a hydraulic power steering apparatus.
Figure 5:
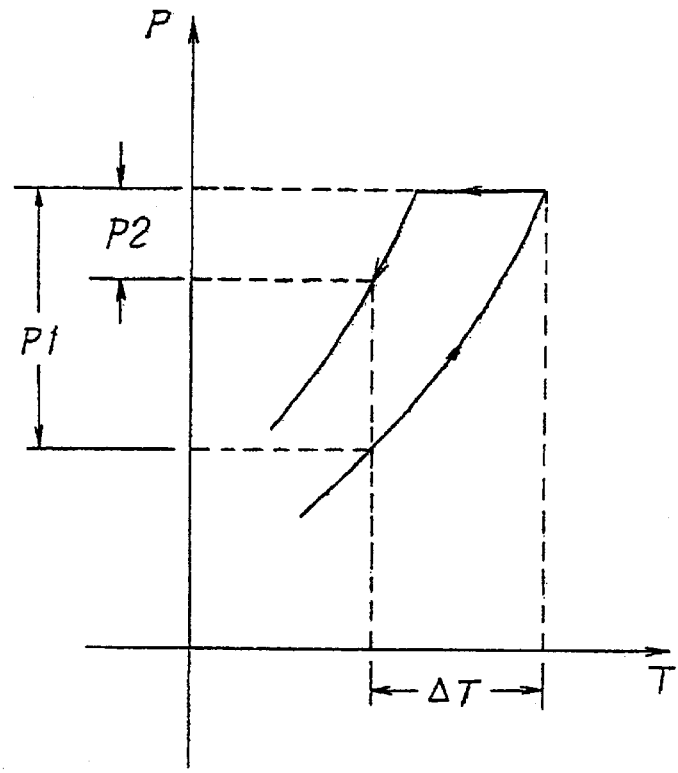
FIG. 5 is a diagram for explaining the effect of the hysteresis characteristics.
Figure 6:
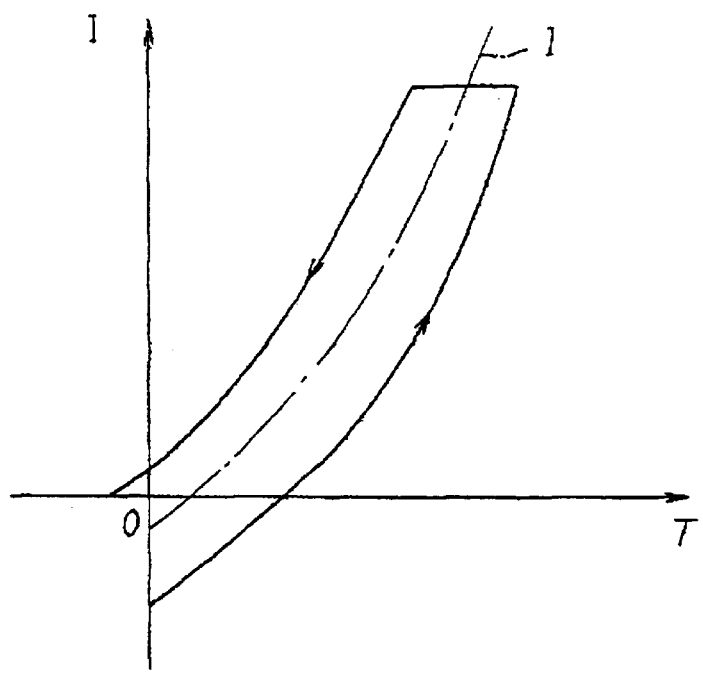
FIG. 6 is a diagram showing an example of the operation of an electric power steering apparatus.
Figure 7:
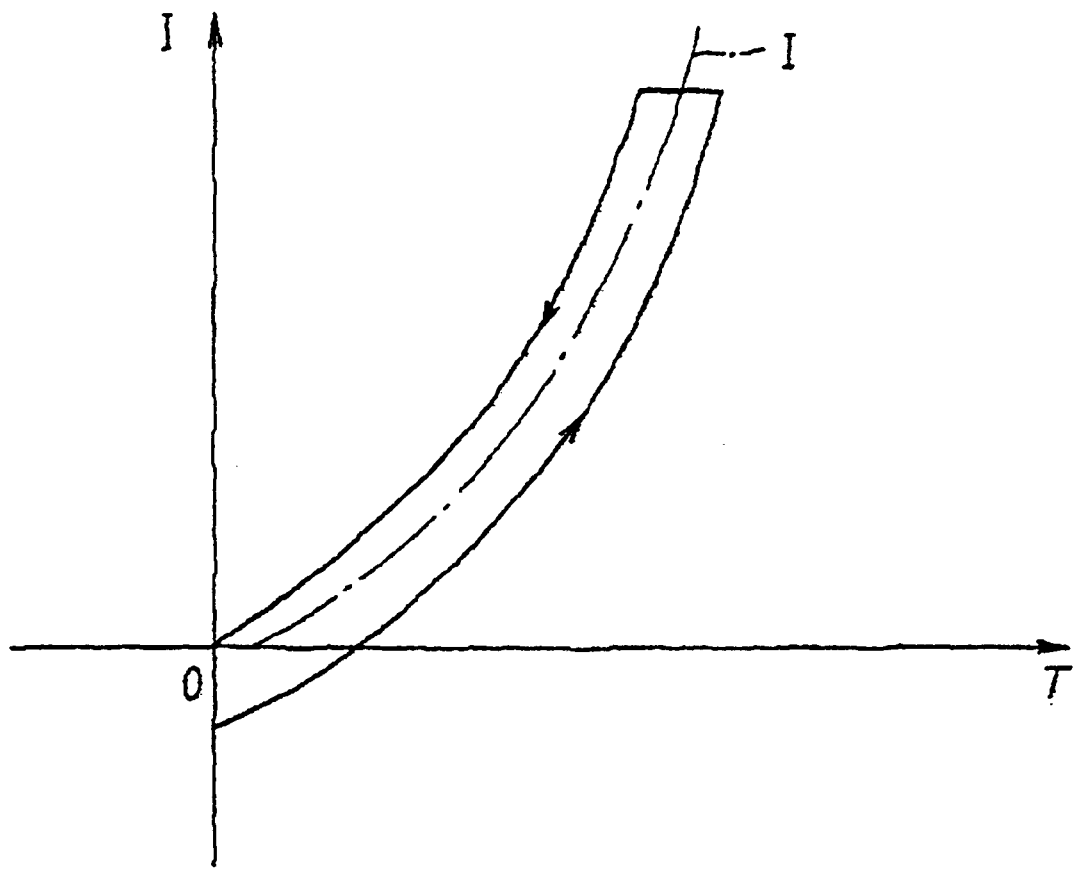
FIG. 7 is a diagram showing an example of the operation of an electric power steering apparatus
Figure 8:
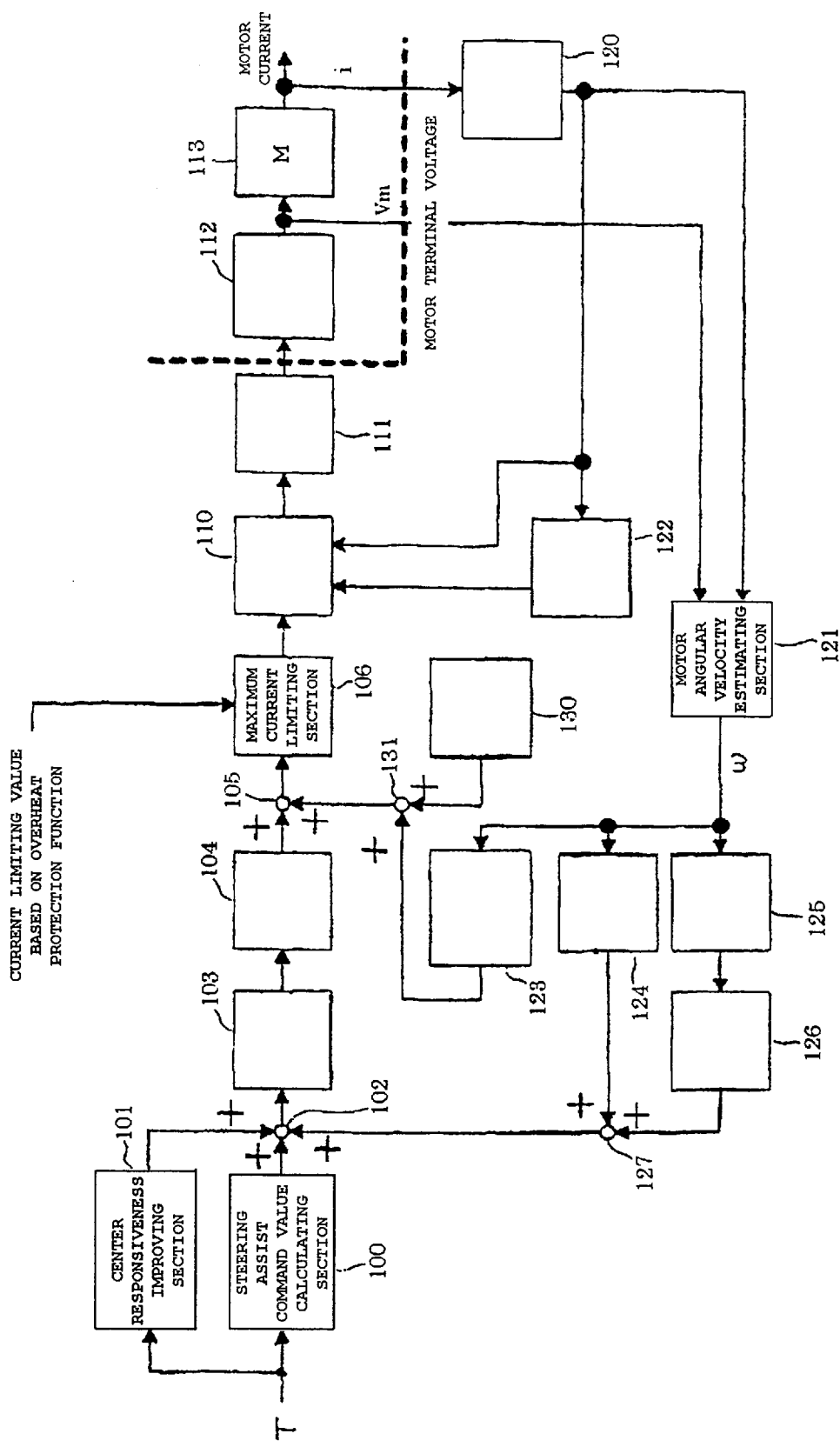
FIG. 8 is a block diagram showing an example of a structure of the present invention.

FIG. 8 is a block diagram showing control functions of the present invention. A steering torque T is inputted to a steering assist command value calculating section 100 and a center responsiveness improving section 101. Outputs from these sections 100 and 101 are inputted to an adder 102. A result of an addition by the adder 102 is inputted to a torque control calculating section 103. An output signal from the torque control calculating section 103 is inputted to a motor loss current compensating section 104. An output signal of the motor loss current compensating section 104 is inputted to a maximum current limiting section 106 via an adder 105. A maximum current value limited by the maximum current limiting section 106 is inputted to a current control section 110. An output of the current control section 110 is inputted to a current driving circuit 112 via an H-bridge characteristic compensating section 111. Based on this, the current driving circuit 112 drives a motor 113.

A motor current i of the motor 113 is inputted to a motor angular velocity estimating section 121, a current drive switching section 122 and the current control section 110, via a motor current offset correcting section 120. A motor terminal voltage Vm is inputted to the motor angular velocity estimating section 121. An angular velocity ω estimated by the motor angular velocity estimating section 121 is inputted to a motor angular velocity estimating section/inertia compensating section 123, a motor loss torque compensating section 124 and a yaw rate estimating section 125. An output of the yaw rate estimating section 125 is inputted to an astringency control section 126. Outputs of the astringency control section 126 and the motor loss torque compensating section 124 are inputted to an adder 127, and are added together by the adder 127. A result of the addition is inputted to the adder 102. The motor loss torque compensating section 124 assists the torque corresponding to a loss torque of the motor 113 to a direction in which the loss torque is generated. In other words, the motor loss torque compensating section 124 assists the torque to a rotation direction of the motor 113. The astringency control section 126 applies braking to the oscillation of the steering wheel for improving the astringency of the yaw of the vehicle.

Further, a current dither signal generating section 130 is provided for generating a dither signal to fine oscillate the motor 113 to a level that the driver does not sense. Outputs of the current dither signal generating section 130 and the motor angular velocity estimating section/inertia compensating section 123 are added by an adder 131. A result of this addition is inputted to the adder 105. A result of the addition in the adder 105 is inputted to the maximum current limiting section 106.

Figure 9:
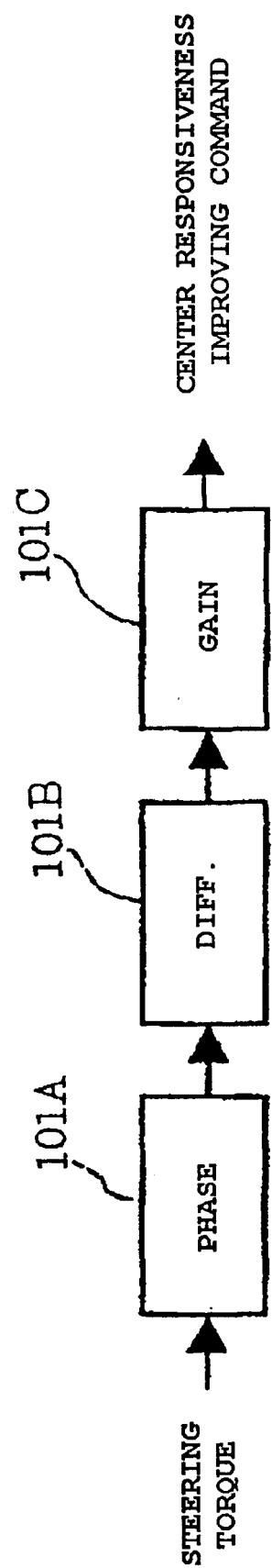
FIG. 9 is a block structure diagram showing a center responsiveness improving section.
Figure 10:
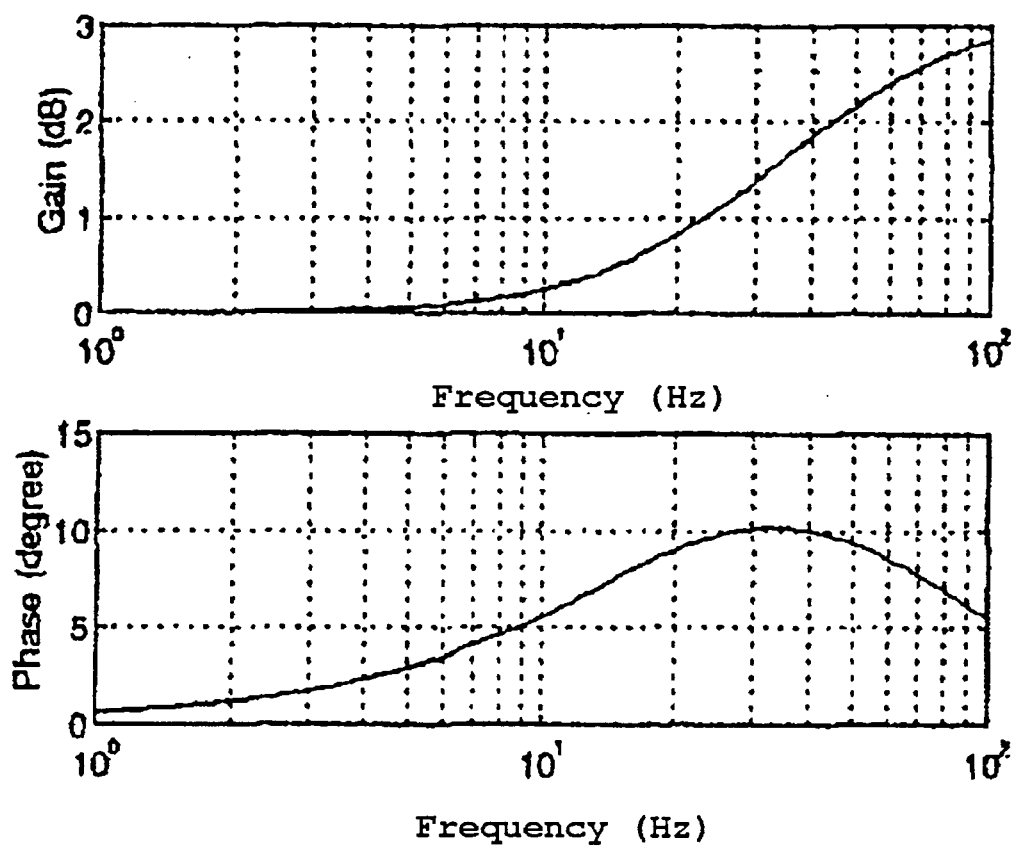
FIG. 10 is a diagram showing an example of a characteristic of a phase advancement compensating section.
Figure 11:
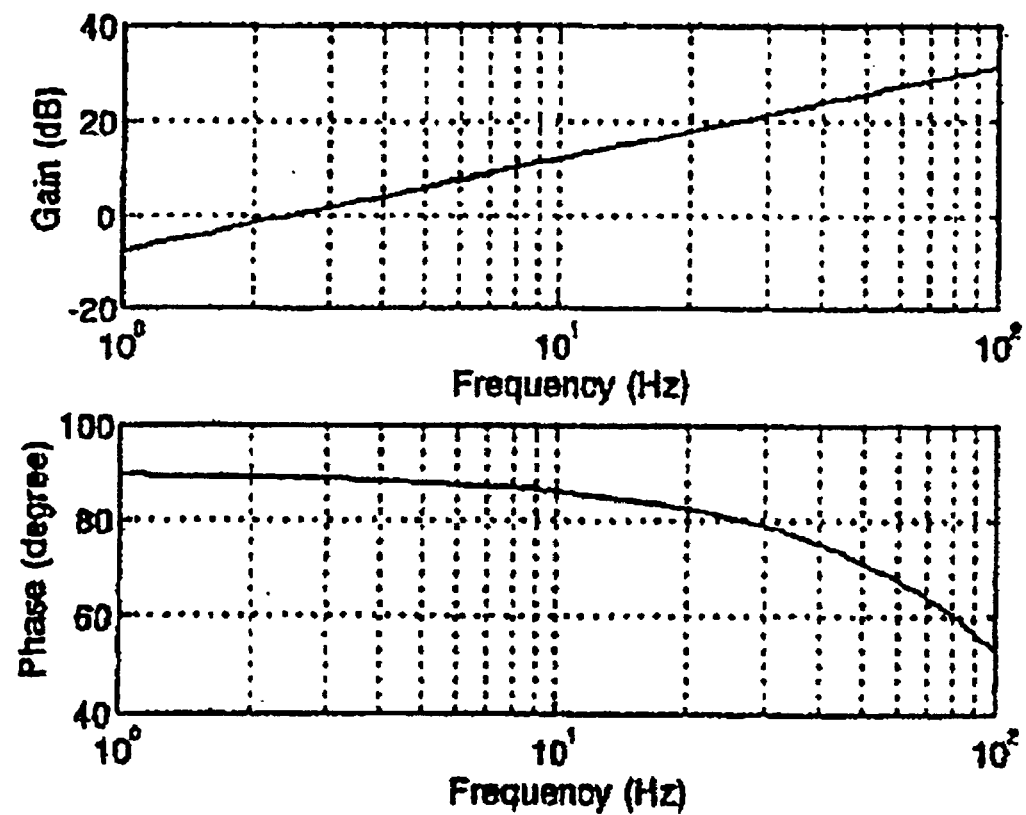
FIG. 11 is a diagram showing an example of a characteristic of an approximate differentiating section.
Figure 12:
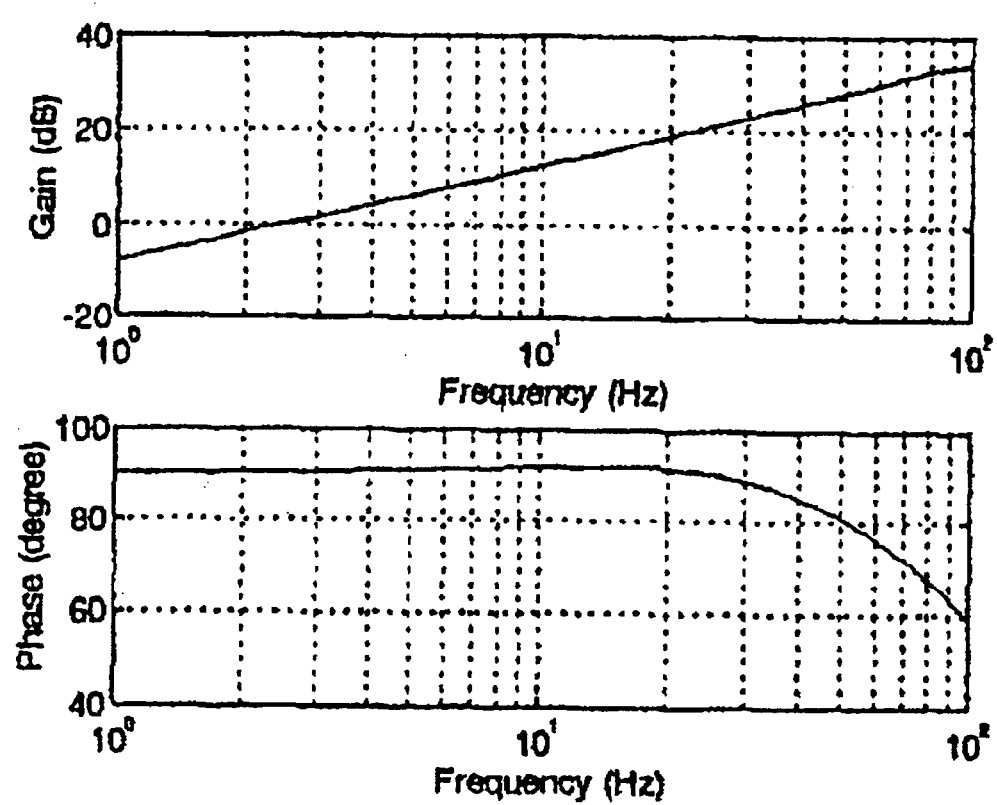
FIG. 12 is a diagram showing a combined characteristic of the phase advancement compensating section and the approximate differentiating section.

Based on the above structure, according to the present invention, the center responsiveness improving section 101 comprises a phase advancement compensating section 101A, an approximate differentiating section 101B and a gain setting section 101C, as shown in FIG. 9. Further, the phase advancement compensating section 101A has a frequency characteristic as shown in FIG. 10, and the approximate differentiating section 101B has a frequency characteristic as shown in FIG. 11. With this arrangement, a combined characteristic of the phase advancement compensation and the approximate compensation becomes as shown in FIG. 12. As a result, it becomes possible to obtain a phase characteristic with no phase delay.

The gain setting section 101C sets a gain by switching the vehicle speed V and the steering torque T. Further, in order to reduce the unstable steering feeling that the steering wheel is suddenly returned, and to stabilize the steering, the steering torque is large, the steering torque change rate is large, and the gain is decreased when the steering torque is in the decreasing direction. In other words, the switching condition is set as follows. |steering torque|(=A) >about 1.37 Nm, and |steering torque–steering torque (one sampling before)|(=B)>about 0.137 Nm, and sign (A)< >sign (B). In the above, sign (A)< >sign (B) means that the signs of (A=steering torque) and (B=steering torque–steering torque (one sampling before)) are different.

Figure 13:
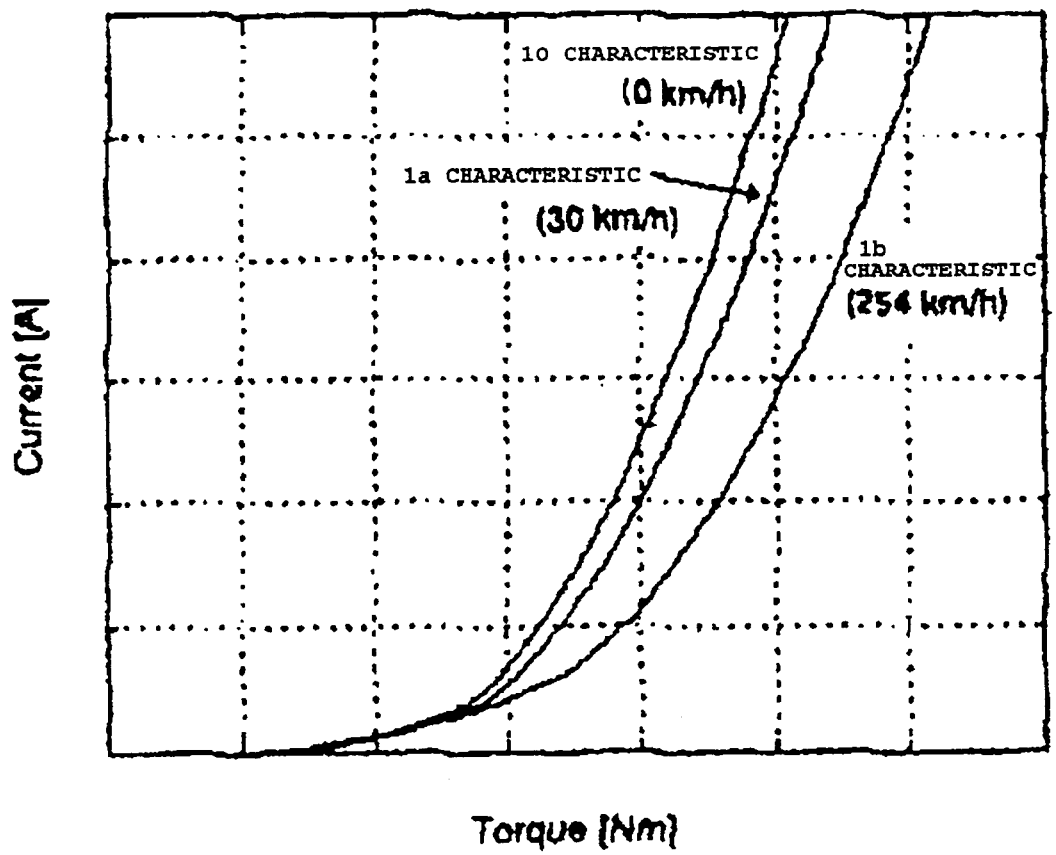
FIG. 13 is a diagram showing a basic assist characteristic.
Figure 14:
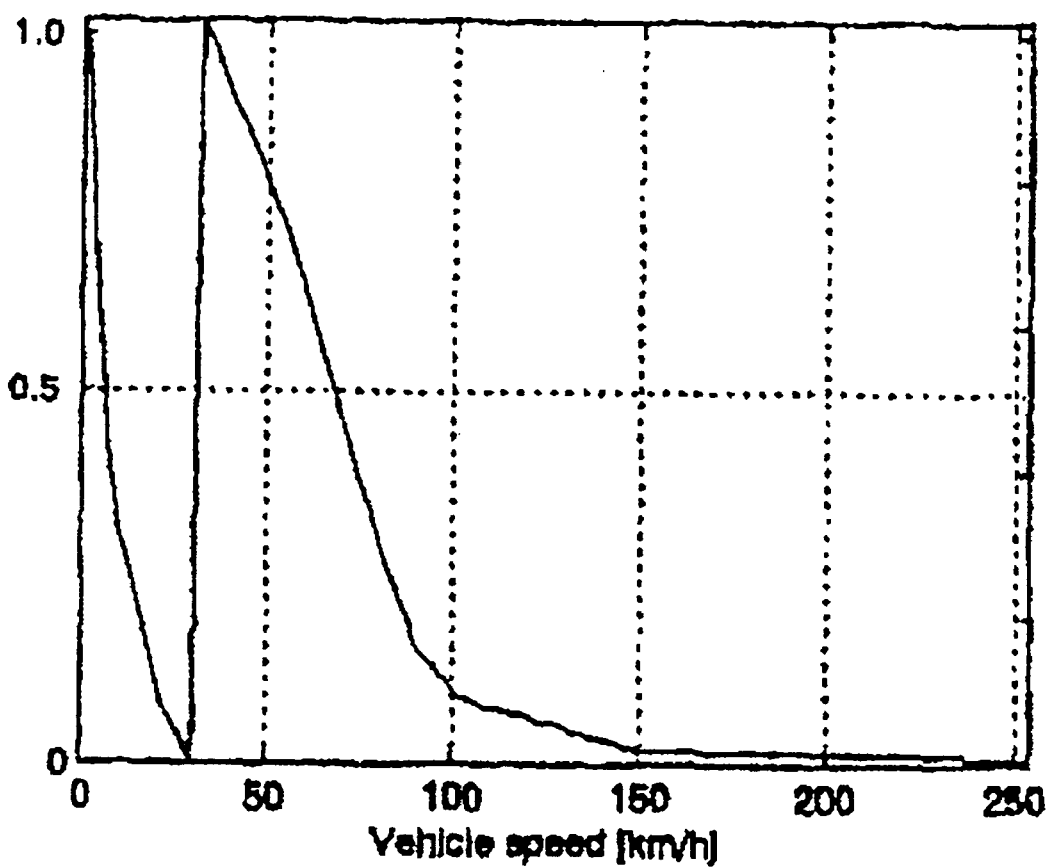
FIG. 14 is a diagram showing an example of a vehicle speed interpolation calculation.

Further, according to the present invention, the steering assist command value calculating section 100 sets the assist characteristic of three representative vehicle speeds (0, 30, 254 Km/h) as a basic characteristic in the calculation of the assist value. The steering assist command value calculating section 100 calculates the assist values at other speeds by interpolating between the basic characteristics for every 2 Km/h of the vehicle speed according to the vehicle interpolation gain. Then, the vehicle speed of the assist characteristic is set to a range from 0 to 254 Km/h, and the resolution is set as 2 Km/h. FIG. 13 shows the basic assist characteristic (torque versus current). The basic assist characteristic is expressed as 0 Km/h=lo characteristic, 30 Km/h=la characteristic and 254 Km/h=lb characteristic. For other vehicle speeds, the assist current is calculated by interpolating between the vehicle speeds for every 2 Km/h using a vehicle (Km/h) versus vehicle speed interpolation coefficient γ shown in FIG. 14. When the vehicle speed is from 0 to 30 Km/h, the assist current I is "I=la(T)+γ(V) (lo(T)−la(T))". When the vehicle speed is from 32 to 254 Km/h, the assist current I is "I=lb (T)+γ(V)(la(T)−lb(T))".

Detailed structures of the steering assist command value calculating section 100 and the center responsiveness improving section 101 will be explained with reference to FIG. 15.

Figure 15:
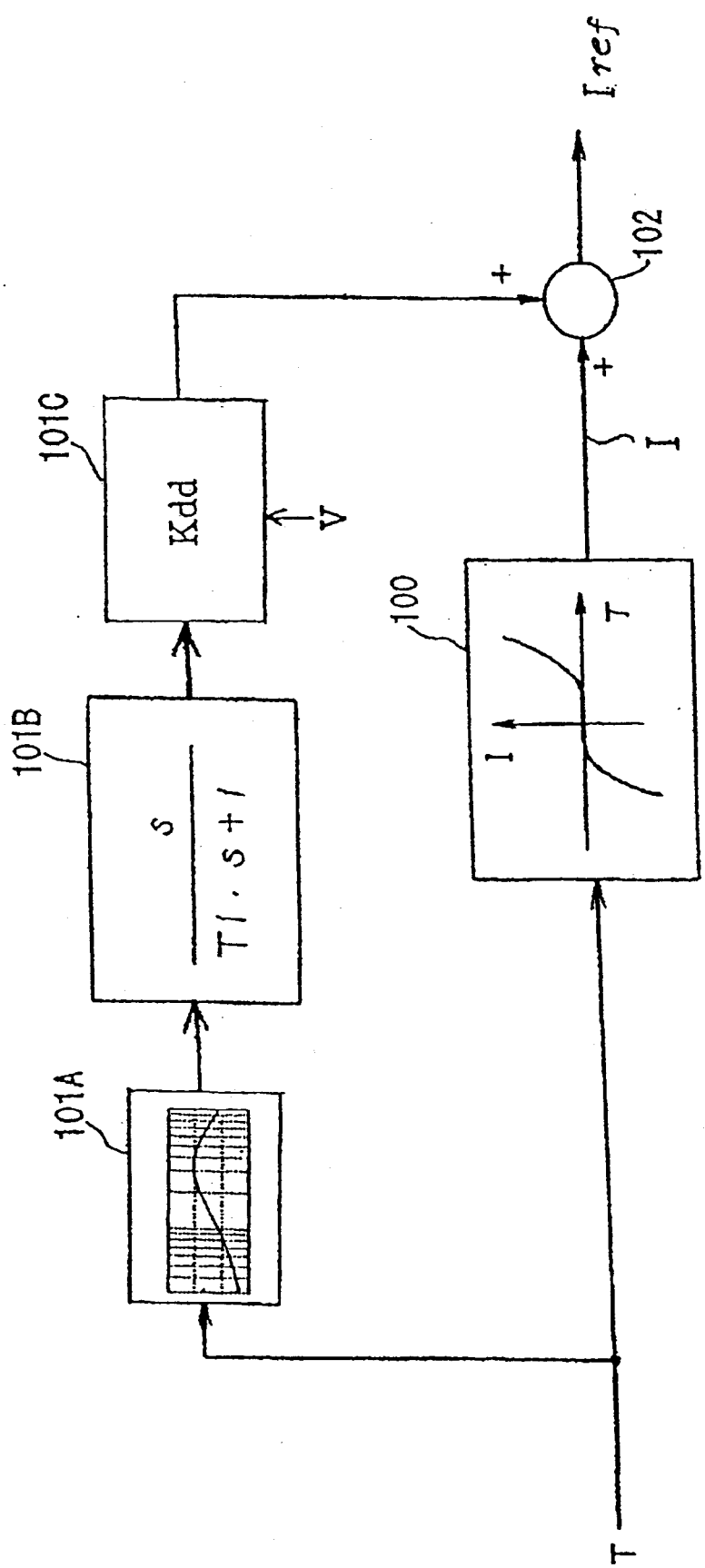
FIG. 15 is a transmission function block diagram showing key elements of the present invention.

The steering assist command value calculating section 100 calculates the steering assist command value I and outputs this in a functional characteristic as shown in a block 100 in FIG. 15. For the sake of simplicity, a relationship of K∝T is assumed, based on ΔI/ΔT=K. The transmission function of the approximate differentiating section 101B is as shown in a block 101B in FIG. 15, by assuming that the gain is "1". Gain Kdd of the gain setting section 101C connected to the latter stage of the approximate differentiator 101B changes according to the vehicle speed V and the steering torque T. The numeral T1 represents an integration time constant, and "s" represents a Laplace variable. The following expression (1) is established for the current command value Iref from the block diagram shown in FIG. 15 when there is no phase advancement compensating section 101A.

$$Iref = K + Kdd \cdot s/(T1 \cdot s + 1) \qquad (1)$$
$$= (K \cdot T1 \cdot s + K + Kdd \cdot s)/(T1 \cdot s + 1)$$
$$= \{(K \cdot T1 + Kdd)s + K\}/(T1 \cdot s + 1)$$
$$= \{K/(T1 \cdot s + 1)\}\{K \cdot T1 + Kdd)s/K + 1\}$$

Then, the following expression (2) is established.

$$(K \cdot T1 + Kdd)/K > T1 \qquad (2)$$

Figure 16:
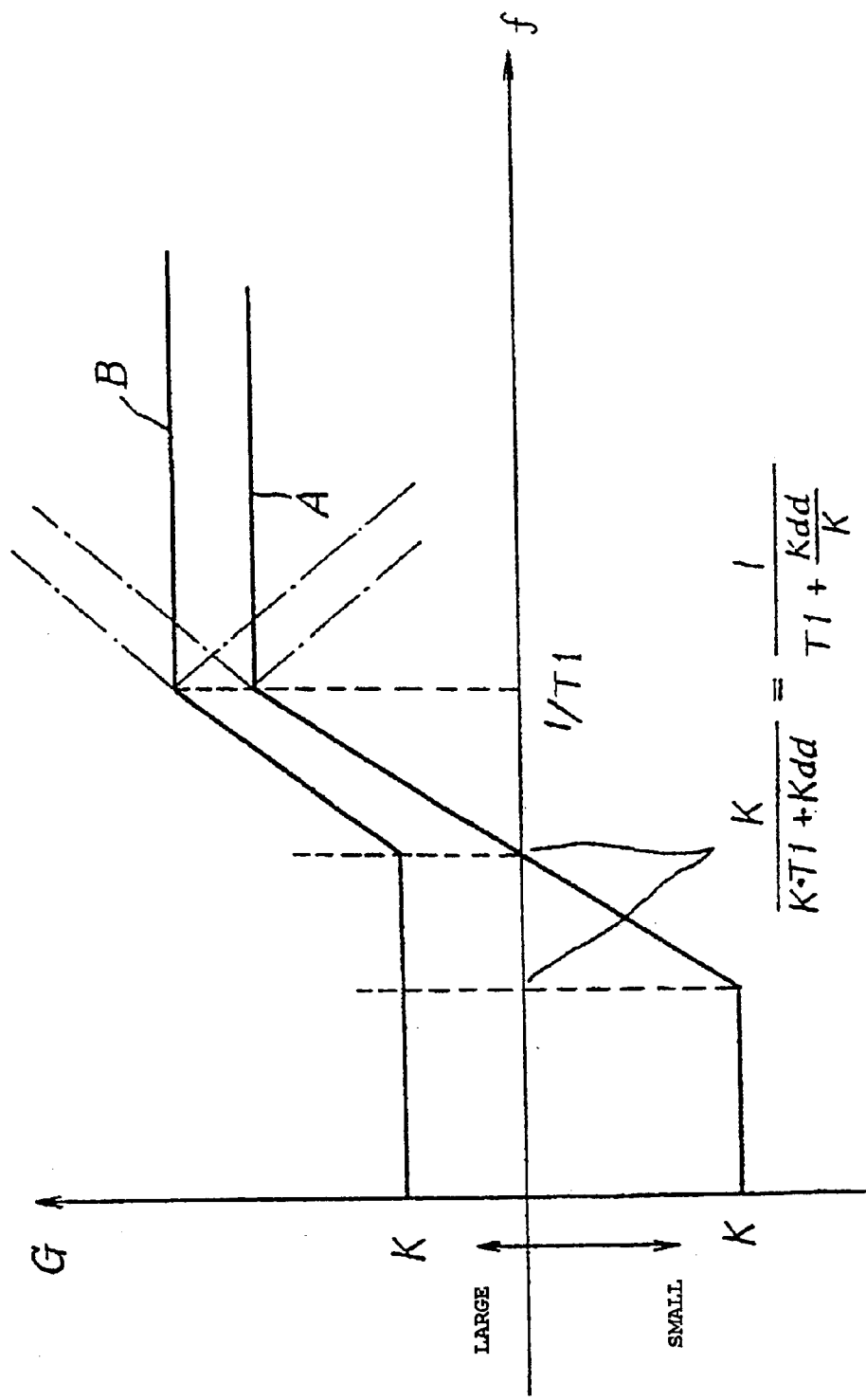
FIG. 16 is a diagram for explaining the operation of the present invention.

Therefore, the frequency characteristic of the expression (1) becomes as shown in FIG. 16.

Figure 17:
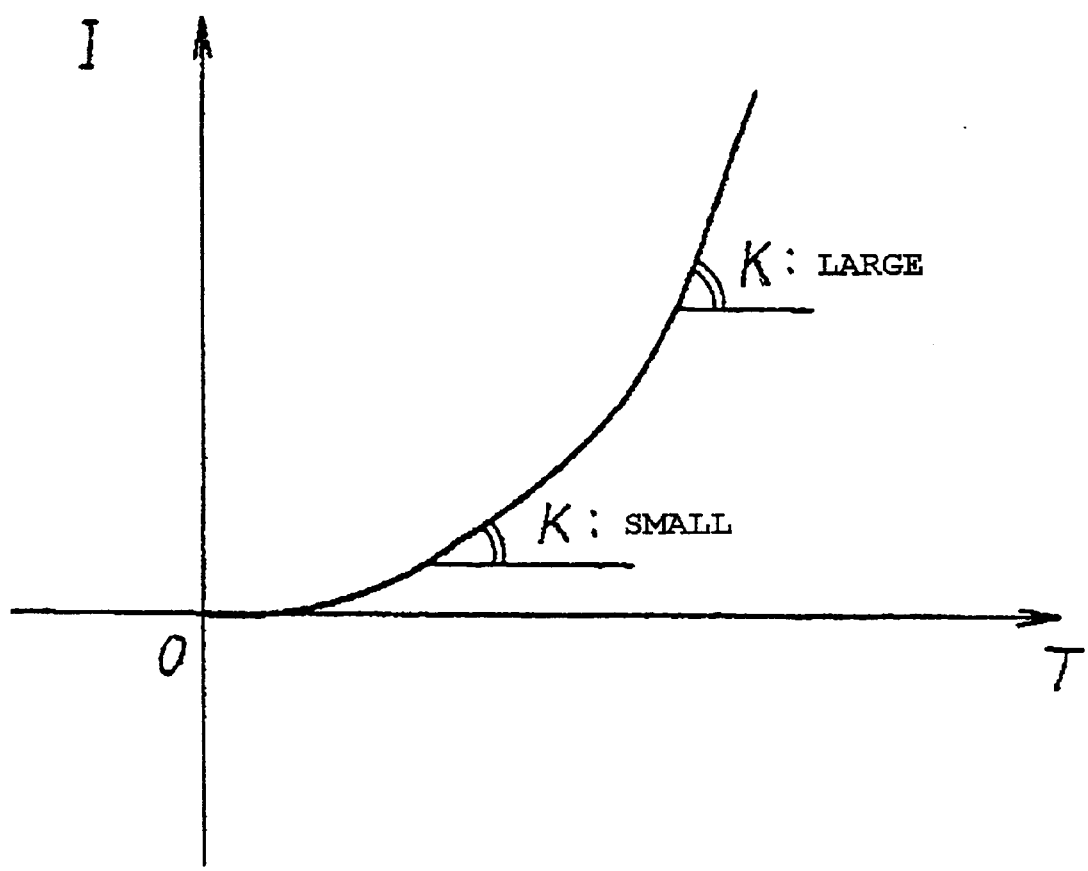
FIG. 17 is a diagram showing an example of a characteristic of a steering assist calculating section.

In comparing the case when an assist characteristic gain K is small with the case when an assist characteristic gain K is large, a difference between gains Gs is small in an area of a frequency "a" or above when the assist characteristic gain K is large, regardless of the sizes of the assist characteristic gains K, as shown in FIG. 16. In other words, in an area of the frequency "a" or above, it is possible to obtain substantially constant responsiveness independent of the sizes of the assist characteristic gains K. The steering assist command value I as the output of the steering assist command value calculating section 100 has such a characteristic that the assist characteristic gain K is small when the steering torque T is small, and the assist characteristic gain K is large when the steering torque T is large, as shown in FIG. 17. As a result, when the steering torque T is small, the responsiveness is lowered than when the steering torque T is large. Therefore, with the provision of the characteristics as shown in FIG. 16, it is possible to maintain the responsiveness in the high-frequency area, and to compensate for the influence of the friction and inertia of the motor.

The above explains the case where there is no phase advancement compensating section 101A. As the phase advancement compensating section 101A works only in relation to the phase, the operation principle is exactly the same when the phase advancement compensating section 101A is inserted. However, as the phase advancement compensating section 101A compensates for only the phase in control, it is possible to securely remove the influence of the motor inertia even when the motor inertia works as a phase delay.

Figure 18:
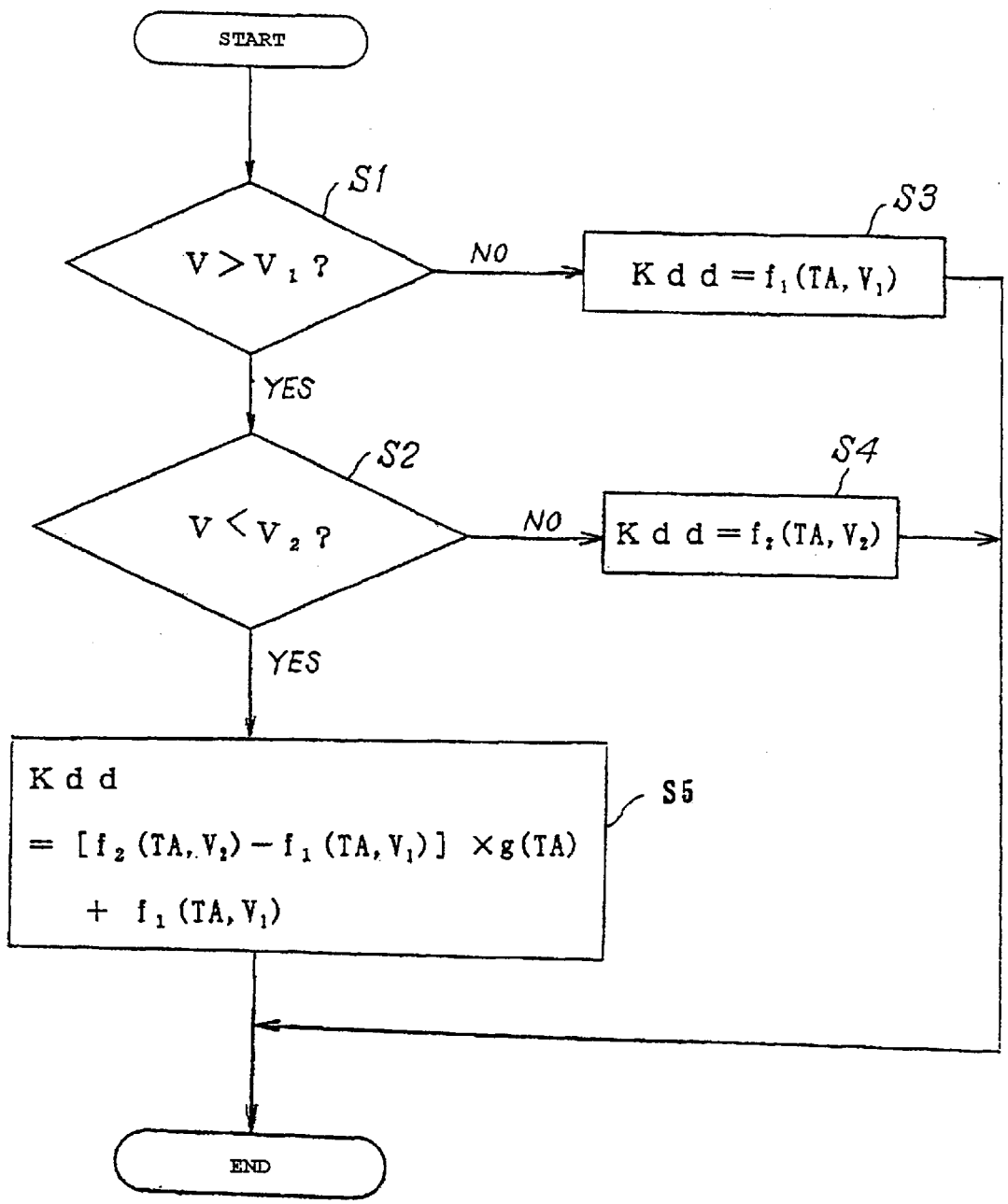
FIG. 18 is a flowchart showing an example of the operation of the present invention.

FIG. 18 is a flowchart showing an example of the operation according to the present invention.

Assume that the vehicle speed V has a relationship of $V_2 > V_1 \geq 0$. First, it is decided whether the vehicle speed V is larger than $V_1$ or not (Step S1). When the vehicle speed V is equal to or smaller than $V_1$, the differential gain Kdd is set to $f_1(TA, V_1)$ (Step S3). When the vehicle speed V is larger than $V_1$, it is further decided whether the vehicle speed V is larger than $V_2$ or not (Step S2). When the vehicle speed V is equal to or larger than $V_2$, the differential gain Kdd is set to $f_2(TA, V_2)$ (Step S4). When the vehicle speed V is smaller than $V_2$, the differential gain Kdd is set as shown in the following expression (3)(Step S5).

$$Kdd=[f_2(TA, V_2)-f_1(TA, V_1)] \times g(TA)+f_1(TA, V_1) \qquad (3)$$

Figure 19:
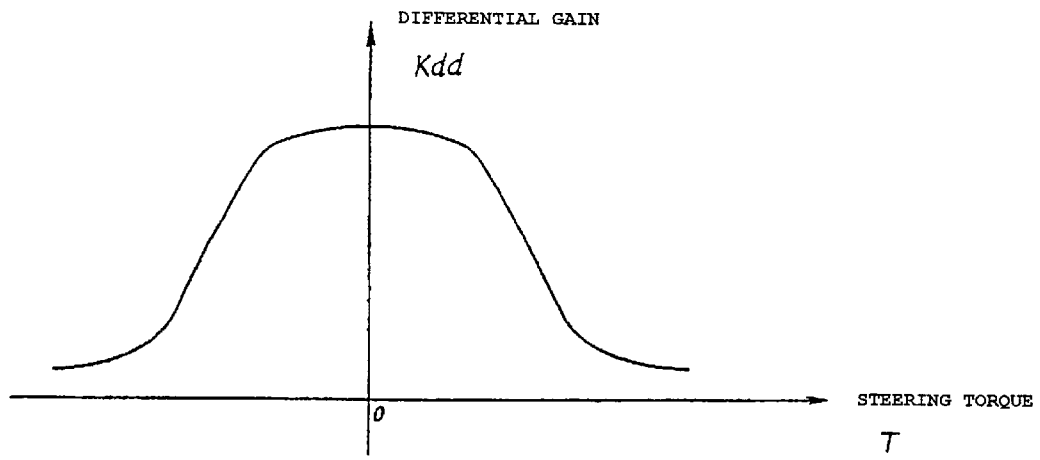
FIG. 19 is a diagram showing an example of a characteristic of differential gain versus steering torque when the vehicle speed is zero according to the present invention.
Figure 20:
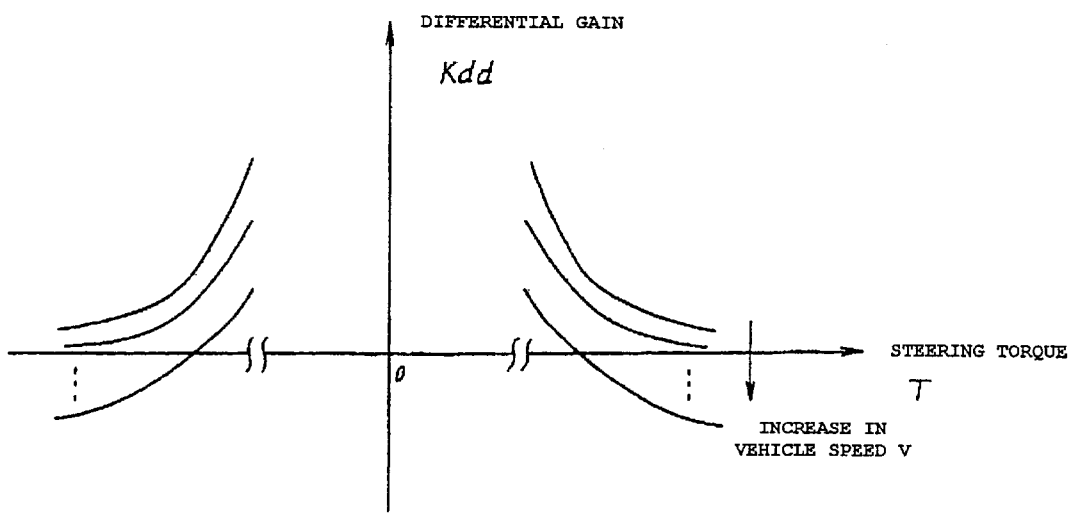
FIG. 20 is a diagram showing an example of a characteristic of differential gain versus steering torque when the vehicle speed is increased according to the present invention.

According to the present invention, the differential gain Kdd is changed using the vehicle speed V as a parameter, and at the same time, the differential gain Kdd is changed relative to the steering torque T as shown in FIG. 19. In other words, FIG. 19 shows a relationship between the steering torque T when the vehicle speed V is 0 and the differential gain Kdd. The differential gain Kdd is set larger in an area where the steering torque T is small, and the differential gain Kdd is set gradually smaller when the steering torque T increases. Then, as shown in FIG. 20, the differential gain Kdd is set gradually smaller as the vehicle speed V increases, in a predetermined area of the steering torque T.

Figure 21:
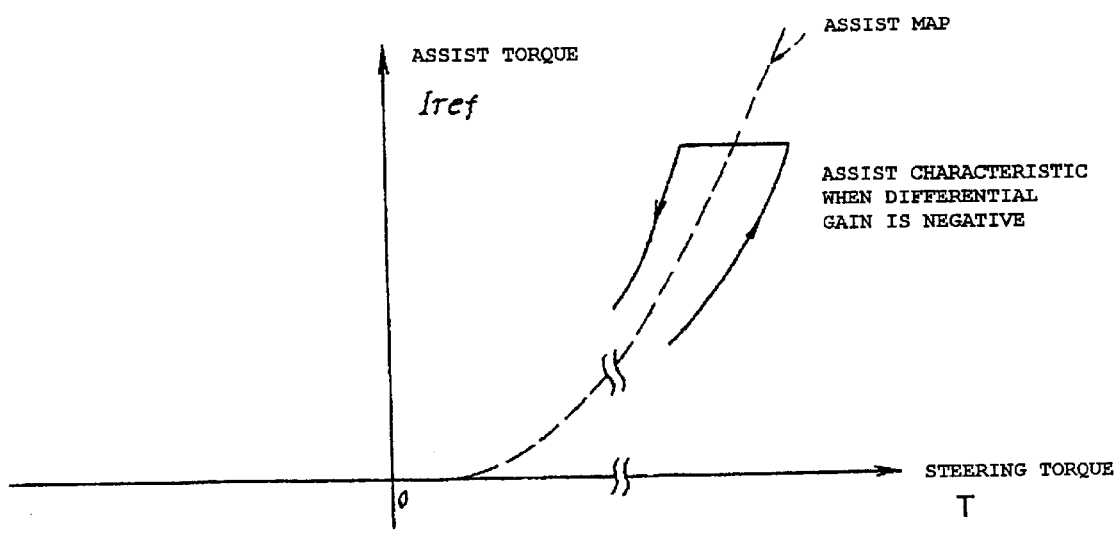
FIG. 21 is a diagram showing an assist characteristic having the hysteresis when a differential gain is negative.

As described above, it is possible to equivalently adjust the hysteresis of the assist characteristic, by setting the differential gain Kdd smaller as the vehicle speed V increases. When the differential gain Kdd has become 0, the hysteresis of the assist characteristic is determined based on the friction of the mechanical system. When the differential gain Kdd has become negative, the hysteresis of the assist characteristic becomes larger than the hysteresis based on the friction of the mechanical system, as shown in FIG. 21.

According to the present invention, with an object of improving the responsiveness of the assist torque and improving the stability of the torque control system, a value proportional to a differential of a steering torque is added to an assist volume (a steering assist command value), by changing a differential gain according to the steering torque and the size of a vehicle speed, in order to increase the responsiveness of the control system. Further, as the phase advancement compensation is inserted into the steering assist command value, it is possible to compensate for the motor inertia. Further, it is possible to achieve both the stabilized responsiveness near the neutral point and the prevention of a sudden reduction in the assist volume. As a result, there is an effect that it is possible to prevent an unnatural feeling of steering and to obtain comfortable steering feeling.

What is claimed is:

1. A control unit for an electric power steering apparatus that controls a motor for giving steering assist force to a steering mechanism based on a current control value calculated from a steering assist command value calculated by a calculator based on a steering torque generated in a steering shaft, and a current value of the motor, the control unit comprising a center responsiveness improving section configured to carry out a phase compensation and differentiation on a torque signal indicative of the steering torque, wherein said control unit adds said torque signal which has been differentiated and phase compensated to the steering assist command value, said center responsiveness improving section comprises a phase compensation section configured to carry out said phase compensation, a differentiating section configured to carry out said differentiation, and a gain setting section configured to set a gain of said torque signal, wherein said phase compensation section carries out phase advancement compensation, and said differentiating section carries out said differentiation on said torque signal which has been phase advancement compensated by said phase compensation section, and wherein said differentiating section carries out approximate differentiation.

2. A control unit for an electric power steering apparatus according to claim 1, wherein said center responsiveness improving section continuously changes a differential gain according to the steering torque and a vehicle speed.

3. A control unit for an electric power steering apparatus according to claim 2, wherein said gain setting section is configured to decrease the gain when said steering torque is large, a steering torque change rate is large and said steering torque is in a decreasing direction.

4. A control unit for an electric power steering apparatus according to claim 2, wherein said phase compensation section carries out phase advancement compensation, and said differentiating section carries out said differentiation on said torque signal which has been phase advancement compensated by said phase compensation section.

5. A control unit for an electric power steering apparatus according to claim 2, wherein said differentiating section carries out approximate differentiation.

6. A control unit for an electric power steering apparatus according to claim 2, wherein the center responsiveness improving section continuously changes a differential gain according to the steering torque and a vehicle speed.

7. A control unit for an electric power steering apparatus according to claim 6, wherein said gain setting section is configured to decrease the gain when said steering torque is large, a steering torque change rate is large and said steering torque is in a decreasing direction.

* * * * *